United States Patent

[11] 3,626,799

| [72] | Inventors | Heinz Joseph Gerber;<br>David R. Pearl, both of West Hartford, Conn. |
|---|---|---|
| [21] | Appl. No. | 13,506 |
| [22] | Filed | Feb. 24, 1970 |
| [45] | Patented | Dec. 14, 1971 |
| [73] | Assignee | Gerber Garment Technology<br>East Hartford, Conn. |

[54] APPARATUS FOR CUTTING AND NOTCHING SHEET MATERIAL
10 Claims, 9 Drawing Figs.

[52] U.S. Cl............................................. 83/132,
    83/513, 83/561, 83/648, 83/658, 83/697, 83/925 CC
[51] Int. Cl............................................. B26d 7/06,
    B26d 11/00
[50] Field of Search........................................... 83/132, 71,
    513, 925 CC, 647, 648, 658, 556, 561, 427, 428,
    697; 33/18

[56] References Cited
UNITED STATES PATENTS
3,548,502  12/1970  Baldwin........................ 83/925 CC X
3,548,697  12/1970  Gerber et al.................. 83/561 X
3,548,699  12/1970  Gerber......................... 83/925 CC X

*Primary Examiner*—Frank T. Yost
*Attorney*—McCormick, Paulding & Huber

ABSTRACT: Apparatus for cutting and notching layups of sheet material includes a layup support means and a main carriage slidably mounted for movement in a first coordinate direction relative to such support means. First and second cutting heads are movably supported on the carriage for movement therewith in said first coordinate direction and for movement with respect thereto in at least one other coordinate direction. The carriage as well as the first and second cutting heads move in response to positioning signals supplied by a computerized controller. A first movable blade or cutting tool is driven by the first cutting head and is adapted to engage the layup to form a cut thereon as the cutting head is moved in a plane parallel to the layup. A second blade or cutting tool is driven from the second cutting head and is adapted to move in a plunging fashion relative to the layup to form a notch or cut therein.

Patented Dec. 14, 1971

INVENTORS
HEINZ JOSEPH GERBER
DAVID R. PEARL

BY
*McCormick, Paulding & Huber*

ATTORNEYS

Patented Dec. 14, 1971

APPARATUS FOR CUTTING AND NOTCHING SHEET MATERIAL

BACKGROUND OF THE INVENTION

This invention relates to an apparatus for cutting sheet material, and is particularly related to an apparatus for cutting a plurality of patterns simultaneously from a layup of sheet material.

Presently, there exists only time-consuming and relatively inefficient means for cutting pattern pieces from sheet material and particularly from a layup of sheet material. In many such cuttings of pattern pieces from a layup it is necessary to form notches or cuts along or inside of the pattern cutting line to indicate points at which the cut pieces will be further operated upon, or matches with similar points of other cut pieces, to produce the various items for which the pieces are cut. To accomplish this purpose, existing devices normally require the operator to first cut one or more pieces of the pattern; and after such pieces are completely cut from the layup, the operator then cuts them again to produce the necessary notches. In any event, present techniques for forming notches generally do not allow the making of a pattern or marker in which two notched edges of two different pieces share a common boundary line, unless one or both of the cut pieces are shifted relative to the remainder of the layup after cutting and before notching. Instead, to accommodate notching without shifting the pieces some waste material must be provided along each notched edge. This is due in most instances to the face that the cutting knife cannot make a plunging type of cut, and therefore in using it to cut notches some waste material must be left adjacent the pattern piece to provide room for maneuvering the knife to a proper position to make a cut generally perpendicular to the edge as required for a notch. Further, in the case of those cutter knives which can make plunging types of cuts, so that the knife can be withdrawn from the material and rotated to a proper attitude for a notch without the necessity of maneuvering in waste material, the minimum length of the cut normally made is much too long for a notch so that waste material must be provided to accommodate the excess length of each notch cut.

The object of the present invention is therefore to provide a more efficient means than presently available for both cutting pattern pieces from a layup of sheet material and for notching such pieces to provide index marks. In particular the aim is to provide such a means whereby the pattern pieces may be notched and cut in any sequence and whereby no waste material need be deliberately provided to accommodate the notching.

SUMMARY OF THE INVENTION

In accordance with the present invention a cutting apparatus for cutting laid up sheet material is provided having a material supporting surface, a main carriage supported for movement in a first coordinate direction relative to the supporting surface, and first and second cutting heads mounted on the carriage for movement relative thereto in at least a second coordinate direction. The first cutting head carries a cutting blade thereon which engages and cuts the material as it is moved in the plane thereof. The second cutting head carries a second cutting or plunging blade thereon which cuts in a plunging fashion as the head is held stationary relative to the material. The plunging blade has a first longitudinal cutting edge which extends along a first side of the blade. A second longitudinal cutting edge extends from the first edge to the cutting tip of the blade. A third cutting edge may be provided and extends longitudinally along a diametrically opposite second side of said blade such that the second and third cutting edges intersect to form the cutting tip. Preferably the second cutting edge extends diagonally from the first cutting edge to the cutting tip of the blade at which it meets the third cutting edge, and preferably the entire blade is coated with a low-friction plastic.

DETAILED DESCRIPTION OF THE PREFERRED EMBODIMENT

Figure 1:
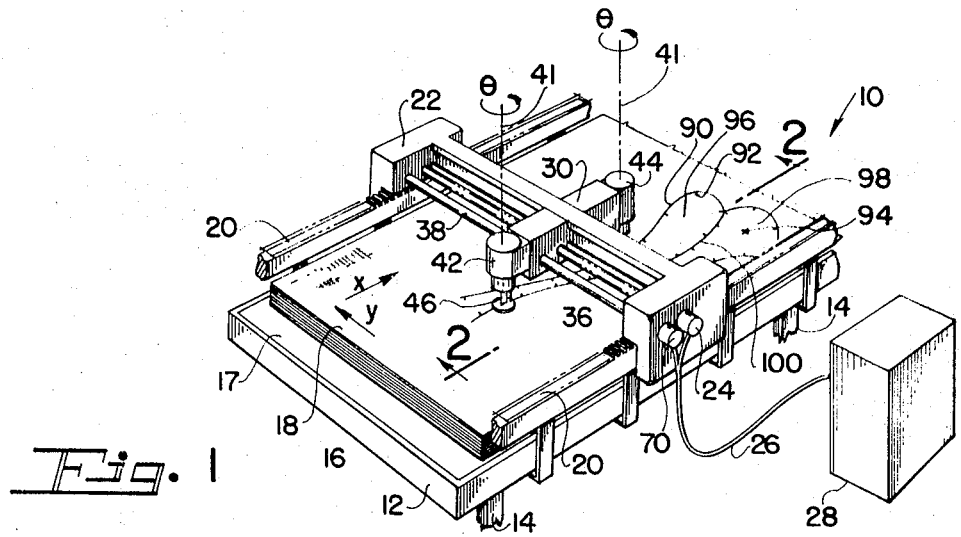
FIG. 1 is a fragmentary perspective view of a cutting and notching apparatus embodying the present invention.
Figure 2:
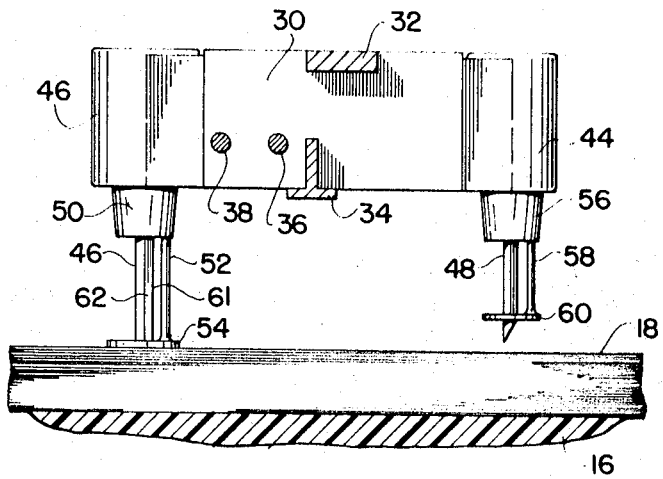
FIG. 2 is a fragmentary longitudinal sectional view taken generally along the lines 2—2 of FIG. 1 and drawn to a scale enlarged from that of FIG. 1.
Figure 3:
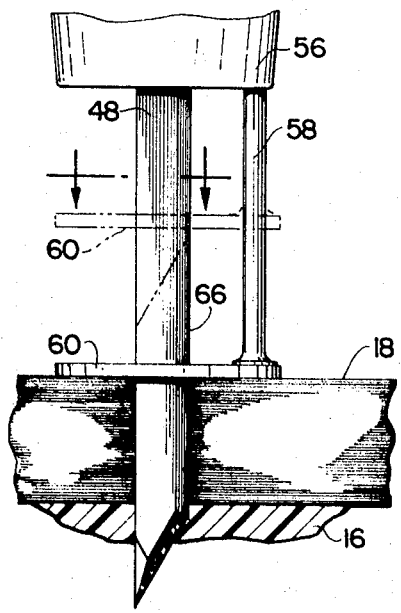
FIG. 3 is a somewhat enlarged fragmentary side elevational view of the notching head of the apparatus of FIG. 1.
Figure 4:
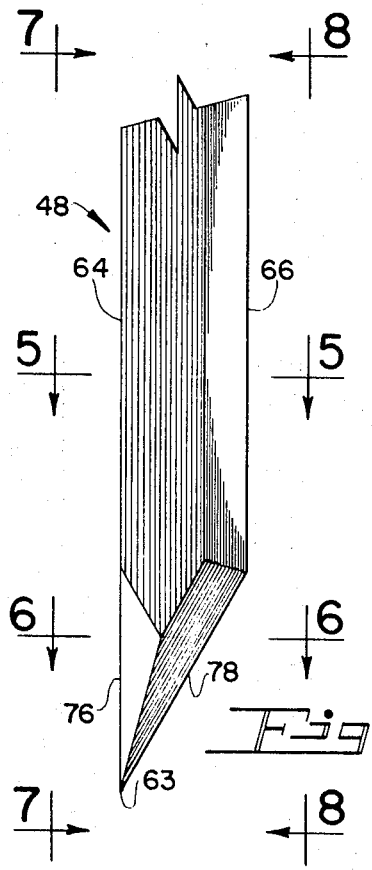
FIG. 4 is a still further enlarged fragmentary side elevational view of the notching or cutting blade of the apparatus of FIG. 1.
Figure 5:
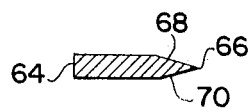
FIG. 5 is a fragmentary sectional view taken generally along the lines 5—5 of FIG. 4.

The sheet material cutting apparatus generally shown at 10 is one which is capable of cutting various different types of sheet material such as porous woven fabric materials or plastic sheets. Preferably the apparatus is used to operate on layers of sheet material stacked up in a layup for the cutting of pattern pieces therefrom. Such pattern pieces are cut out to produce the necessary parts for upholstery, garments and many other items. Referring to FIGS. 1 to 3 the apparatus 10 comprises a table 12 which rests on support legs 14, 14 and supports a bed of penetrable material 16. This bed 16 may be a single continuous layer of penetrable material or it may be formed from individual replaceable blocks of such material. Preferably it is made of a porous foam material, such as foamed polyethylene, which provides a fairly rigid upper supporting surface 17 for the material to be cut and which nevertheless can be easily penetrated and cut by a knife type of cutting tool. Ethafoam, a product of the Dow Chemical Company, has proven particularly suitable as the penetrable material.

A layup of material to be cut is indicated as 18 and is supported on the upper surface of the bed 16. As shown, the illustrated layup 18 is held on the bed 16 solely by its own weight. In many instances it may be desirable to use some additional holding means for pressing the layup more tightly against the bed 16, particularly in the cutting zone, to prevent shifting of its various layers relative to one another and to achieve other advantages. Such holding means do not form a part of the present invention and when used may take various different forms. As an example, a vacuum chamber located below the bed 16 and an air-impervious sheet spread over the layup, as described more fully in pending patent application, Ser. No. 821,780, filed May 5, 1969, now U.S. Pat. No. 3,495,492 issued Feb. 17, 1970, and entitled "Apparatus for Working on Sheet Material," could be used to provide a holding effect.

The table 12 also has located on opposite sides thereof longitudinally extending racks 20, 20 on which a carriage 22, referred to as the main or X carriage, rides in the illustrated X coordinate direction. The carriage 22 bridges the table 12 and has pinions (not shown) thereon which engage the racks 20, 20 to drive it in the X coordinate direction over the surface of the bed 16 and the layup 18. These pinions are powered by a motor 24 which receives drive signals through the line 26 from a numerical or computerized controller 28.

Another carriage 30, referred to as the tool or X carriage, carries the tools that operate on the layup of material and is supported by the main carriage for movement relative thereto in the illustrated X coordinate direction by guide rails 33 and 34 and a guide rod 36 of the carriage 22. The carriage 30 is driven by a lead screw 38 powered by a motor 40 in turn controlled by drive signals supported thereto by the controller 28 over the line 26. The tools carried by the tool carriage 22 include a cutting head 42 at one end thereof and a notching head 44 at the other end thereof. From the foregoing it will therefore be understood that as a result of the movement of the main carriage 22 relative to the table in the X coordinate direction and the movement of the tool carriage in the Y coordinate direction relative to the main carriage, the tools carried by the tool carriage may be moved to any point on the layup 18 and may be made to follow any desired line thereon.

Before proceeding further, it should be noted that in the illustrated device 10, and as described above, the cutting head 42 and the notching head 44 are both mounted on the same tool carriage 30 so as to move in unison. Such an arrangement is not, however, necessary to the broader aspects of the invention and if desired the two heads could be mounted on separate tool carriages each carried by the main carriage 22 and movable independently of one another in the Y coordinate direction, a separate lead screw and drive motor being provided for each such tool carriage.

The cutting head 42 includes a reciprocating cutting blade 46 and the notching head 44 includes a plunging type blade 48. That is, the blade 46 is intended to cut along a line on the layup 18 and is reciprocated at a relatively fast rate as it is moved in the plane of the layup along a desired line of cut. The blade 48, on the other hand, is intended to make notches in the layup 18 and is normally plunged into the layup and withdrawn only once for each cut or notch made thereby. The cutting head 42 includes a motor (not shown) for reciprocating its blade 46 during a cutting operation and also another associated motor (not shown) for lifting it and its blade vertically to enable the blade to be withdrawn entirely from the layup 18 at the end of a line of cut for movement to a new starting position, and to be relowered to cutting engagement with the layup at such new starting position. The cutting head also includes a motor (not shown) for moving its blade 48 up and down to execute a plunging cut. Both cutting heads 42 and 44 also each further include a means for rotating its associated blade about a vertical or θ axis 41 in response to control signals from the controller 28 for maintaining the blade 46 tangent to the line of cut and for orientating the blade 48 so as to have the notch formed thereby extend in the desired angular direction. The cutting head 42 includes a member 50 having attached thereto a connecting rod 52 with a stripper plate 54 at its lower end. The stripper plate 54 surrounds the blade 46 and has an opening therein for allowing the blade 46 to pass therethrough and operatively engage the layup. The stripper plate 52 may be constructed so as to engage and serve as a guide for the blade 46, but more importantly it prevents layers of material in the layup 18 from being dislodged from their laid up positions, during each upstroke of the blade 46, due to adhesion of the layers of fabric to the blade 46. When the cutter head 42 is raised bodily to withdraw the blade 46 entirely from the layup its stripper plate is raised therewith.

The notching head 44 also includes a support member 56, a connecting rod 58 attached to the member 56, and a stripper plate 60 carried by the lower end of the rod 58. In FIG. 3 the solid lines show the blade 48 and the stripper plate 60 in their fully lowered positions and the broken lines show them in their fully raised positions. The stripper plate 60 and blade 48 move independently of one another between these positions. At the start of a plunging cut by the blade 48 the blade is first positioned over a point to be cut with both it and the stripper plate 60 in their raised positions. Then the blade is plunged downwardly through the layup and the stripper plate is moved downwardly into contact with the upper surface of the layup. In this part of the operating cycle either the downward movement of the blade may proceed that of the stripper plate or vice versa, or both may move in unison, the important point being that the stripper plate be brought into engagement with the layup before the blade is withdrawn. Following this the blade is withdrawn to its raised position while the strippper plate remains in engagement with the layup and then the stripper plate is finally raised to its raised position. The movement of the stripper plate 60 may be obtained either by a means for moving the connecting rod 58 relative to the body of the cutting head 44 or by fixing the connecting rod 58 to the support member 56 and providing means for bodily raising the entire cutting head.

It should be noted that when the notching blade 48 is moved to its fully lowered position its sharp point is received in the material of the bed 16 so as to make a clean cut in all of the layers of the layup, particularly the bottom-most layers. For this reason, the bed is constructed, as mentioned, of a material that can be easily cut, and it is also preferably one which can be easily replaced after it has been cut a large number of times.

The reciprocating cutting blade 46 of the cutting head 42 may take many different forms and, for example, may be similar to one of those disclosed in pending U.S. Pat. application Ser. No. 821,723, filed May 5, 1969, now U.S. Pat. No. 3,548,697 issued Dec. 22, 1970, and entitled "Apparatus for Cutting Sheet Material." In the illustrated case, and as best shown in FIG. 2, the blade 46 has one longitudinal cutting edge 61 which curves to meet the opposite noncutting rear edge of the blade at the lower end of the blade. The blade 46 reciprocates within a sheath 62 which surrounds its rear portion, leaving the cutting edge exposed, and follows the blade at least partially into the cuts made in the laid up material. The sheath 62 functions mainly as a guide and helps to strengthen the blade during its cutting operations.

Figure 6:
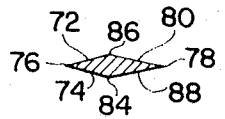
FIG. 6 is a fragmentary sectional view taken generally along the lines 6—6 of FIG. 4.
Figures 7, 8:
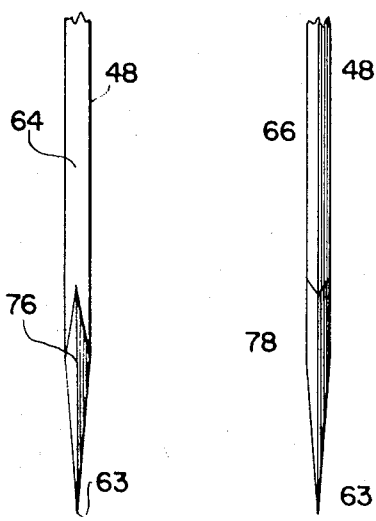
FIG. 7 is a fragmentary front elevational view taken generally along the lines 7—7 of FIG. 4.
FIG. 8 is a fragmentary back elevational view taken generally along the lines 8—8 of FIG. 4.

The notching blade 48 of the notching head 44 is preferably made from tungsten carbide and has a unique construction which permits it to be easily inserted in a plunging fashion into the laid up material and to make a precise and neat cut. To produce the desired penetrating ability the lower end of the blade 48 preferably converges into a single sharp cutting point 63. Along the major portion of its length the blade is formed with a dull or unsharpened rear edge 64 and a sharpened forward cutting edge 66. The forward cutting edge 66 is formed by two planes 68, 70 converging to meet at the edge 66. Along the lower end portion of the blade, it is shaped adjacent its rear edge to form two planes 72 and 74 which converge on a line or an edge to form a sharpened rear edge 76 of relatively short length. This short sharpened rear edge increases the sharpness of the point 63, however, such increased sharpness of the point is not always needed and if desired the sharpened rear edge 76 may in some cases be omitted. A short sharpened cutting edge 78 is also formed along the front of the lower portion of the blade. The cutting edge 78 extends diagonally across the width of the blade to meet the rear cutting edge 76 at the point or tip 63 and is formed by the intersection of planar sides 80 and 82. The four converging planes 72, 74, 80 and 82 also form the illustrated side edges 84, 86 best shown in FIG. 6 to form the point 63. This permits the blade 48 to make a very sharp and precise cut as it is plunged through the layup.

Although the tip 63 of the illustrated plunging blade 48 is shown as being formed by four converging planes it may be appreciated that the tip could also be formed by only three conveying planes or by a larger number of converging planes such as 6 or 8. It can also be appreciated that the blade 48 may be formed such that the juncture between the forward edges 66 and 78 is curved. Further, the side edges 84 and 86 may be smoothed out so that the side of the blade is curved from the rear edge 76 to the forward edge 78.

In cutting a notch with the blade 48 its point 68 is inserted in the layup at the point it is desired that the cut or notch begin. The edges 78 and 66 then carry on the cutting of the notch to its desired length as the blade is moved through the layup, the length of the finished notch being approximately equal to the front to rear thickness of the blade. As mentioned, the cutting blade 46 is operated by its motor in the cutting head 42 so as to be reciprocated to effect a desired cutting operation along a given line. However, the cutting operation of the notching blade 48 consists of a single plunging cut into the layup 18. Thus, after the notching head 44 has been brought over the desired spot on the layup 18, the blade 48 is driven downwardly in a single plunging stab to make the necessary cut. The blade 48 does not carry out any linear cutting by continued reciprocation as is the case with the blade 46. However, if some linear cutting were desired, the apparatus could be programmed for this type of cutting.

Figure 9:
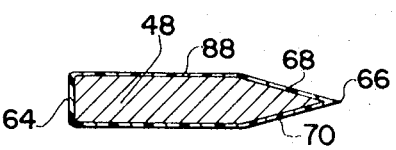
FIG. 9 is a still further enlarged fragmentary sectional view taken generally along lines 9—9 of FIG. 3.

To decrease the adhesion of the notching blade 48 to the layers of the sheet material in the layup and to allow it to pass more easily through the layup, it may be partially or totally covered with a coating 88 of a low-friction plastic as shown in FIG. 9. A good example of such a low-friction plastic is Teflon or polytetrafluoroethylene, but other types of low-friction plastic also may be used to fully or partially coat the blade. In addition to decreasing the force required to insert and withdraw the blade such coating also usually results in the blade retaining its sharpness for a much longer period of time than when it is not so coated.

The operation of the described apparatus may now be more fully stated by reference to FIG. 1. The reciprocating cutting blade 46 moves along desired lines on the layup 18 to cut desired pattern pieces therefrom as the result of signals received from the controller 28. One such line of cut is indicated at 90. In addition to this the cutting head is operated to plunge its notching blade into the layup at various points along the line of cut to form marking notches such as indicated at 92, 92. This may be done either before or after the cutting of the line 90. The blades 46, 48 therefore operate intermittently and independently of each other such that when one is in a cutting position the other is in a raised position.

With the present apparatus notches can be made at any point on a pattern with great precision. Notches can be cut into a layup 18 along a cut or uncut line of a pattern such as the line 90. Further, the notching blade 48 can also be used to make single slits or cruciform cuts, such as indicated at 94, at any point within the boundaries of a pattern piece, a cruciform cut consisting merely of two notch cuts made at right angles to one another. Also, as a result of its plunging action and its relatively short forward to rear dimension it can produce notch cuts along a line of cut without any portion of the notch extending beyond the boundary of the pattern piece defined by the line. This, therefore, allows two pattern pieces, such as indicated at 96 and 98, to share a common boundary line 100, thereby eliminating the need for waste material between such pieces.

We claim:

1. An apparatus for cutting sheet material, said apparatus comprising means defining a material supporting surface, a main carriage supported for movement in a first coordinate direction relative to said supporting surface, a first cutting head carried by said main carriage for movement therewith in said first coordinate direction and movable relative thereto in a second coordinate direction, said first cutting head including a linear cutting tool adapted to engage sheet material supported on said supporting surface and to cut it along a line as it is moved in the plane of said supporting surface, and a second cutting head carried by said main carriage for movement therewith in said first coordinate direction and movable relative thereto in said second coordinate direction, said second cutting head including a notch cutting tool adapted to plunge into and out of sheet material supported on said supporting surface to cut a notch therein while said second cutting head is held stationary in the plane of said supporting surface.

2. An apparatus for cutting sheet material as set forth in claim 1 wherein said means defining said material supporting surface comprises a bed of material which is readily penetrated by said notch cutting tool.

3. An apparatus for cutting sheet material as set forth in claim 1 wherein said notch cutting tool is a blade having a sharp cutting point directed toward said supporting surface and at least one sharp cutting edge intersecting said point and extending therefrom in its direction generally away from said supporting surface.

4. An apparatus for cutting sheet material as set forth in claim 3 wherein said cutting edge extends throughout substantially the entire length of said blade.

5. An apparatus for cutting sheet material as set forth in claim 3 wherein said cutting point of said blade is formed by four converging planes.

6. An apparatus for cutting sheet material as set forth in claim 1 wherein said notch cutting tool is a blade at least partially coated with a low friction plastic material.

7. An apparatus for cutting sheet material as set forth in claim 6 wherein said blade is made from tungsten carbide.

8. An apparatus for cutting sheet material as set forth in claim 6 wherein said low friction plastic material is polytetrafluoroethylene.

9. An apparatus for cutting sheet material as set forth in claim 1 wherein said notch cutting tool comprises a blade having a sharp cutting point directed toward said supporting surface, a first longitudinal cutting edge along a first side thereof, a second longitudinal cutting edge extending from said first edge to said cutting point, and a third longitudinal cutting edge extending along a second diametrically opposite side of said blade, said second and third edges intersecting at said cutting point.

10. An apparatus for cutting sheet material as set forth in claim 1 further including first and second stripper means mounted on said first and second cutting heads and located respectively adjacent said linear cutting tool and said notch cutting tool so as to be engageable with the top surface of the sheet material received on said supporting surface.

* * * * *

PO-1050
(5/69)

UNITED STATES PATENT OFFICE
CERTIFICATE OF CORRECTION

Patent No. 3,626,799   Dated December 14, 1971

Inventor(s) Heinz Joseph Gerber and David Raymond Pearl

It is certified that error appears in the above-identified patent and that said Letters Patent are hereby corrected as shown below:

Col. 1, line 15, "matches" should be --matched--.

Col. 1, line 30, "face" should be --fact--.

Col. 2, line 71, "X" should be --Y--.

Col. 2, line 74, "X" should be --Y--; "33" should be --32--.

Col. 3, line 43, "orientating" should be --orienting--.

Col. 3, line 71, "proceed" should be --precede--.

Col. 4, line 61, "conveying" should be --converging--.

Signed and sealed this 4th day of July 1972.

(SEAL)
Attest:

EDWARD M. FLETCHER, JR.　　　　ROBERT GOTTSCHALK
Attesting Officer　　　　　　　　Commissioner of Patents